(12) United States Patent
Chapman

(10) Patent No.: US 7,677,591 B2
(45) Date of Patent: Mar. 16, 2010

(54) BEACH CART FOR RECREATION AND SPORTS

(76) Inventor: R. Craig Chapman, 7504 Spyglass Way, Raleigh, NC (US) 27615

(*) Notice: Subject to any disclaimer, the term of this patent is extended or adjusted under 35 U.S.C. 154(b) by 30 days.

(21) Appl. No.: 12/075,749

(22) Filed: Mar. 13, 2008

(65) Prior Publication Data
US 2009/0230646 A1 Sep. 17, 2009

(51) Int. Cl.
*B62B 1/04* (2006.01)
(52) U.S. Cl. ............... 280/652; 280/47.23; 280/47.24
(58) Field of Classification Search ........... 280/652, 280/47.18, 47.19, 47.24, 47.27, DIG. 6, 645, 280/642
See application file for complete search history.

(56) References Cited

U.S. PATENT DOCUMENTS

| | | | |
|---|---|---|---|
| 251,001 A | 12/1881 | Keeler | |
| 524,210 A | 8/1894 | Peter | |
| 1,915,234 A | 6/1933 | Magusin | |
| 2,636,627 A | 4/1953 | Stoker | |
| 3,659,865 A | 5/1972 | Nothacker | |
| 3,677,571 A * | 7/1972 | Maturo et al. | 280/654 |
| 3,679,227 A | 7/1972 | Rock | |
| 4,533,151 A | 8/1985 | Maitland | |
| 4,565,382 A | 1/1986 | Sherman | |
| 4,659,142 A | 4/1987 | Kuchinsky, Jr. | |
| 4,703,944 A * | 11/1987 | Higson | 280/30 |
| D296,026 S * | 5/1988 | Sugarman et al. | D34/25 |
| D303,049 S | 8/1989 | Higson et al. | |
| D303,883 S | 10/1989 | Higson et al. | |
| D329,995 S | 10/1992 | Trurnlington, Jr. | |
| 5,203,815 A * | 4/1993 | Miller | 43/21.2 |
| 5,269,157 A * | 12/1993 | Ciminelli et al. | 62/457.7 |
| D345,842 S | 4/1994 | Sloan et al. | |
| 5,464,237 A * | 11/1995 | Saporiti | 280/30 |
| 5,636,852 A * | 6/1997 | Sistrunk et al. | 280/30 |
| 5,660,403 A * | 8/1997 | O'Neill et al. | 280/47.19 |
| 5,833,250 A * | 11/1998 | Schier et al. | 280/47.19 |
| D403,827 S | 1/1999 | Smoker | |
| 5,887,878 A | 3/1999 | Tisbo et al. | |
| 5,944,333 A * | 8/1999 | Kent | 280/204 |
| 6,113,129 A * | 9/2000 | Marques et al. | 280/654 |
| 6,131,925 A * | 10/2000 | Weldon | 280/30 |
| 6,264,230 B1 | 7/2001 | Huggins | |
| 6,386,557 B1 * | 5/2002 | Weldon | 280/30 |
| 6,648,349 B1 * | 11/2003 | Waller et al. | 280/47.35 |
| 6,736,416 B1 * | 5/2004 | Romeo | 280/47.26 |
| 6,860,490 B2 | 3/2005 | Song | |
| 6,883,267 B1 | 4/2005 | Pruitt | |
| 7,188,844 B2 * | 3/2007 | Hinds | 280/47.25 |

(Continued)

*Primary Examiner*—Jeffrey J Restifo
(74) *Attorney, Agent, or Firm*—Paul M. Denk

(57) ABSTRACT

The beach cart has two arcuate rails having two ends. Upon one end, the rails have a handle and on the other end, an axle and a pivoting plate. The axle spans the rails and has two wheels. The plate attaches to each rail at a hinge. The plate pivots from a position perpendicular to the rails to a position folded upon the rails. When unfolded, the plate supports cargo, and when folded, the plate supports a tabletop as the handle is positioned down and the cart positioned flat. Between the rails, a curved panel stiffens the cart. The curved panel has a tube in communication with two openings for carrying an umbrella. Centered at the crest of the panel, an aperture receives a beach umbrella when the invention is placed down at the beach.

9 Claims, 10 Drawing Sheets

U.S. PATENT DOCUMENTS 7,210,545 B1 * 5/2007 Waid .................. 180/65.1
2002/0125668 A1 9/2002 Sims
2005/0099038 A1 5/2005 Hinds

* cited by examiner

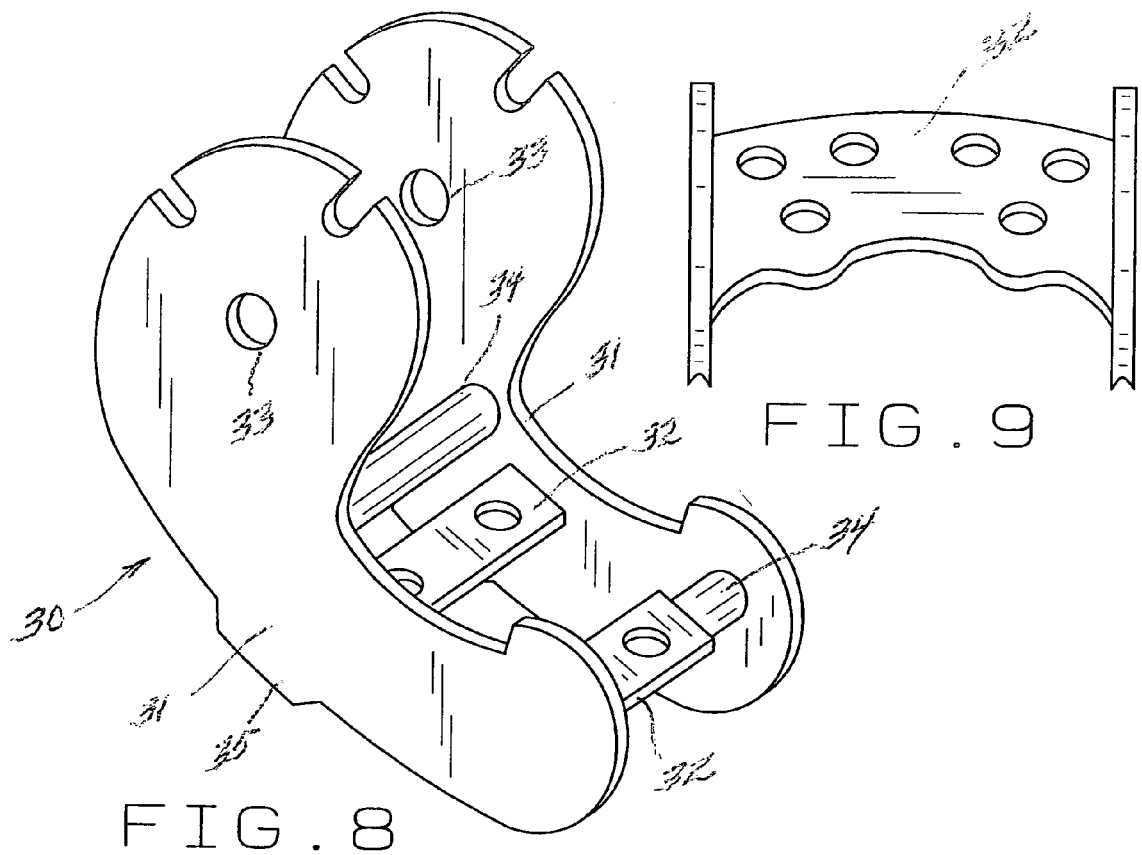
FIG. 8
FIG. 9
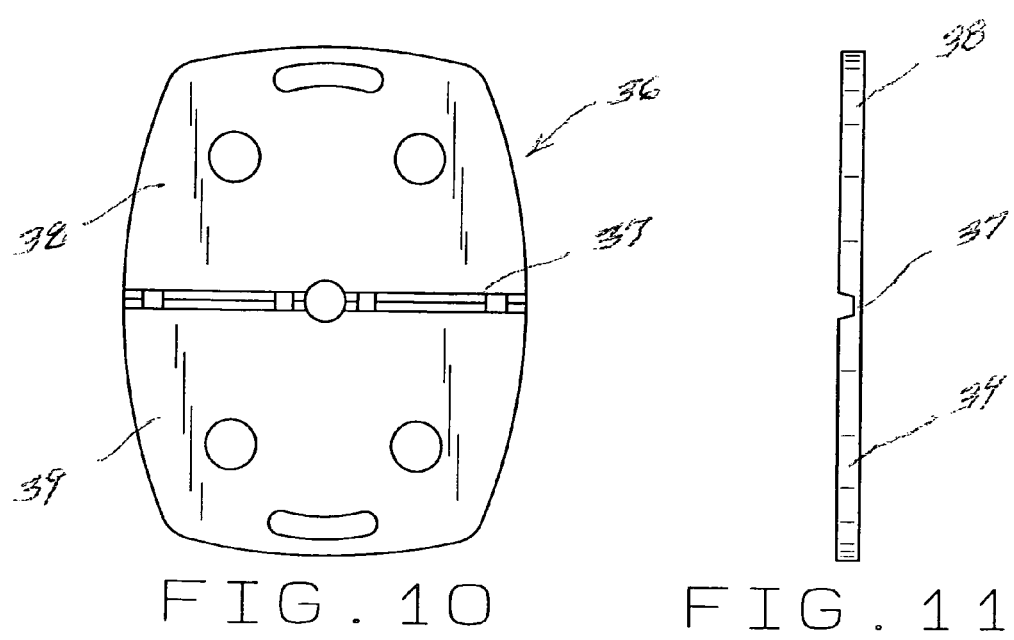
FIG. 10
FIG. 11

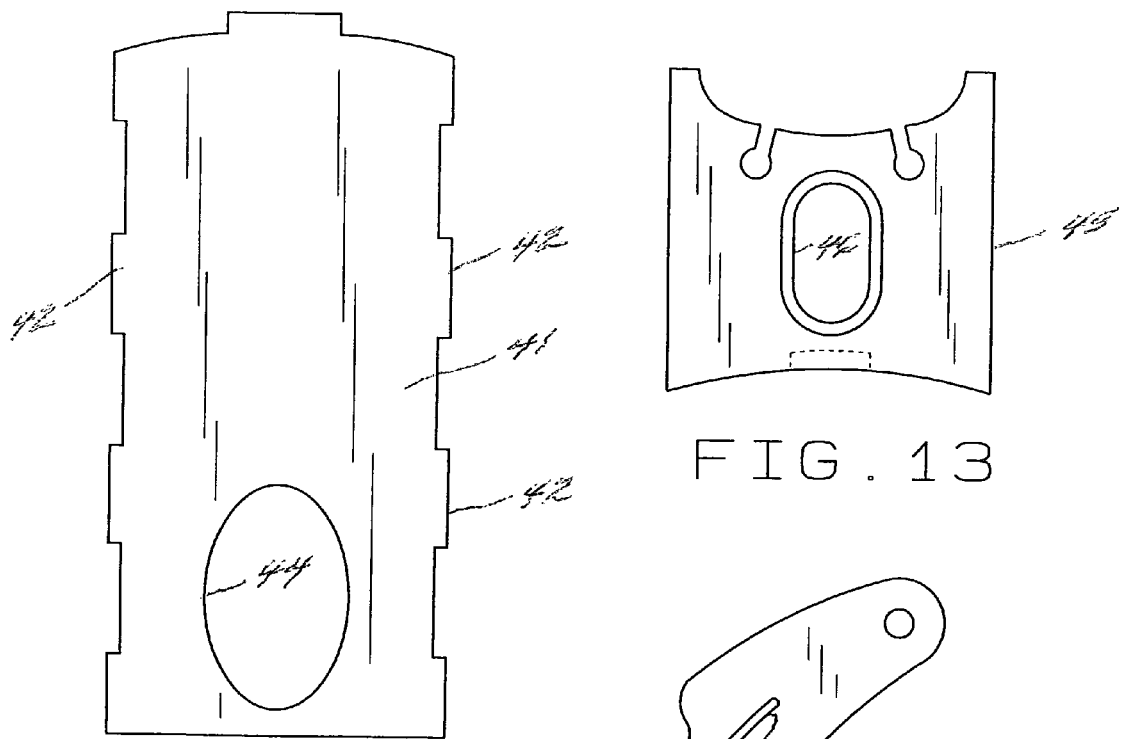
FIG. 12
FIG. 13
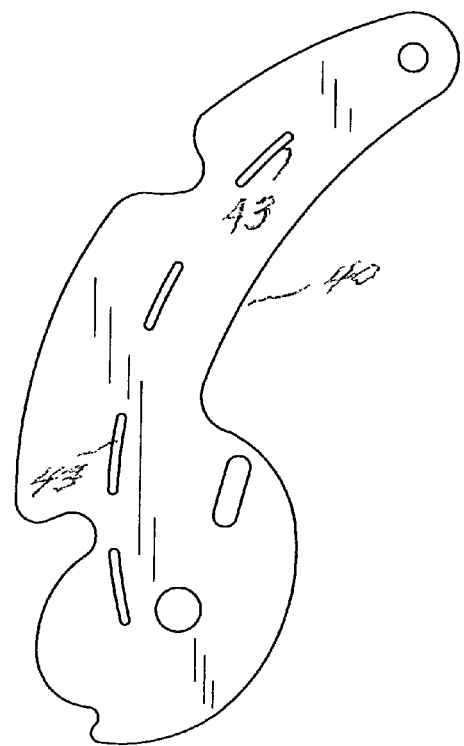
FIG. 14

BEACH CART FOR RECREATION AND SPORTS

BACKGROUND OF THE INVENTION

The beach cart relates generally to dollies, carts, and handtrucks. More specifically, the present invention refers to carts for hauling gear to a beach. A unique aspect of the present invention is an aligned opening and tube for carrying an umbrella within the cart.

For centuries, people have gone to the beach at the ocean, on a lake, or other body of water. People partake in many activities at the edge of the water. When remaining at the water for a few hours, people bring gear and equipment for their activities. Some activities include food and beverages while others include lounging at the water's edge. Food and beverages are transported to the beach in coolers and baskets. Lounging occurs in chairs often beneath umbrellas. This cart can be used at the beach, or at other outdoor activities, such as parties in the park, reunions, at sporting events, or even in the backyard.

Presently, people carry their cooler, baskets, chairs, and umbrellas to the beach by hand. Usually, all of the gear can not be carried by one person, particularly if a cooler is involved. People make multiple trips from a car to the beach to bring all of the gear. Alternatively, people in a group divide up the gear for the walk to the beach from the cars. Once upon the beach, carrying gear increases the difficulty in crossing sand for people.

The current invention, on the other hand, provides a cart for carrying the gear of people going to the beach or other water body. Upon arrival near the beach, people unload their car and place the gear upon the cart. Once the gear is stowed upon the cart, the cart is pulled by a person towards the beach. The cart can carry a beach umbrella, chairs, cooler, baskets, and other gear all on one piece of equipment. The cart can have widely spaced wheels for stability upon a sandy or muddy surface.

DESCRIPTION OF THE PRIOR ART

However, people have developed many carts and wagons over the years. Wagons have at least two axles beneath a body for carrying cargo. Carts have one axle for also carrying cargo though of lesser weight than that for a wagon. As the present invention has a single axle, further discussion elaborates upon carts more so than wagons. Early carts had a body placed upon a suspension system that connected to an axle. Animals and people initially moved carts and eventually, motors moved carts. Animals were positioned between two rails and pulled the cart behind them. People grasped the rails and more often a handle and pushed a cart ahead of them. In time, carts developed a fixed plate at the ends of the rails opposite the handle and between the wheels. People placed the plate beneath cargo and tipped the cargo onto the cart, more accurately called a handtruck. People then moved cargo as desired often within a warehouse or between a vehicle and a warehouse. Handtrucks and carts performed well upon solid pavements but encounter difficulty in loose sand, mud, and other rough terrain. Handtrucks and carts also hold much cargo but do not support lengthy cargo, such as an umbrella, extending forward or outward of the handle.

Regarding other patents, the patent to Keeler, U.S. Pat. No. 251,001, which issued back in 1881, shows a design for a combined child's chair, see-saw, wagon, and swing. Though not that related to the beach cart, it does show a cart-like structure, that incorporates the various types of components after the wagon has been maneuvered to the site of usage.

The patent to Magusin, U.S. Pat. No. 1,915,234, shows another combined child's vehicle and support. This appears to be an early type of collapsible child's transporter.

The patent to Peter, U.S. Pat. No. 524,210, shows a truck that can be set up as a wheelbarrow. Then, the device can be turned over so that it may be set up and utilized as a table. This is relevant to the concept of the invention, where it may be converted into a table structure.

The patent to Stoker, U.S. Pat. No. 2,636,627, shows a trash can handling device that can haul a trash can to and from the curb.

The patent to Nothacker, U.S. Pat. No. 3,659,865, shows a safety seat for children. This is just a seat that can hold a child, similar to the more current car seat, which can be either located rearwardly, or reversed or forward movement.

The patent to Rock, U.S. Pat. No. 3,679,227, shows a utility cart that can also be used upon the beach, such as a soft surface or ground, due to the usage of the fluted type wheels.

The patent to Maitland, U.S. Pat. No. 4,533,151, shows a combination carrier, chair, and lounge/table. This device does show the combination of a carrier, and a table, which apparently are the two main attributes of the present invention.

The patent to Sherman, U.S. Pat. No. 4,565,382, shows a combined portable table and hand truck. This particular device also shows the combination of a carrier, and a table, which can be used at a picnic or camping site.

The patent to Kuchinsky, Jr., U.S. Pat. No. 4,659,142, shows a combination beach caddy and beach chair. The present invention does have some relationship to this patent, when this patented device is used as a caddy, its chair portion is lowered as it is pulled by its handle similar to the present invention.

The patent to Higson, U.S. Pat. No. 4,703,944, shows another beach caddy that lacks elements of the present invention. Then the patent to Higson, et al, No. Des. 303,049, shows a combination table and carrier or the like. But the present invention does not share the appearance of the device in this patent. And, the patent to Higson, et al, No. Des. 303,883, is the design patent for the two previous patents, and therefore, because the present invention does not have the appearance or shape of these particular designs, it would not be related.

The patent to Turnlington, Jr. No. Des. 329,995, shows an invalid carrying beach chair with telescoping handle. And the designed appearance of the carrier shown therein does not look like the present invention.

The letters patent U.S. Pat. No. 5,203,815, to Miller, is upon an apparatus for carrying fishing equipment. But the present invention is not generally designed for use as a fishing equipment carrier.

The patent to Sloan, et al, No. Des. 345,843, is also upon a beach cart as a variation upon the early Higson patented carts. The design and appearance of the cart as shown therein is not similar in appearance to the present invention.

The patent to Smoker, No. Des. 403,827, is also upon a beach cart with a totally distinct appearance from the present invention.

The patent to Marques, et al, U.S. Pat. No. 6,113,129, shows a wheeled beach cart construction but the present invention is assembled outside the scope of these claims.

The patent to Tisbo, et al, U.S. Pat. No. 5,887,878, shows a gardening center. The present invention is not made in accordance with the claims of this patent as it excludes any type of a plastic base, any plastic modular forming bins, shelves, crates, etc.

The patent to Weldon, U.S. Pat. No. 6,131,925, shows another beach device that has a seating platform unlike the present invention.

The patent to Huggins, U.S. Pat. No. 6,264,230, shows a foldable hand cart that has a second frame member unlike the present invention. The second frame member connects in a rotational scissor fold with the first frame member. The present invention also excludes any type of a framed stabilizing means that connects a first frame member to a second frame member.

The patent to Pruitt, U.S. Pat. No. 6,883,267, shows a mobile fishing caddy which is not the present invention.

The published application No. U.S. 2002/0125668, to Sims, shows a beach carrying device or a wheeled skid for hauling a storage container over the surface of sand. And finally, the published application No. U.S. 2005/0099038, to Hinds, shows a seating apparatus which is not a feature or structure of the present invention.

The present invention though overcomes the limitations of the prior art where a need exists for a cart to carry gear for the beach and to travel across sand and other low traction areas, or for related uses. That is, the art of the present invention, a cart, carries an umbrella within the rails, supports an opened umbrella placed through the rails, and carries gear upon a folding plate thus encouraging a group of people to carry all of their gear through the cart in a single trip upon this one device. The opening and tube within the rails carries a folded umbrella while the aperture in the rails supports an opened umbrella when the cart is parked. The present invention collapses for storage in a vehicle, unfolds to carry coolers and other bulky gear, supports an umbrella, and provides a flat surface for use as a table, all while at the beach or other location.

SUMMARY OF THE INVENTION

The beach cart begins with two spaced apart arcuate rails having two ends. Upon one end, the rails have a handle for pulling the cart. On the opposite end, the rails accept an axle and a pivoting plate. The axle spans perpendicular to the rails and has two mutually spaced apart wheels. The cart is designed to freely interchange between narrow tire and wide tire options with consideration of standard 32" door opening widths. The plate attaches to each rail in a hinged connection. The plate pivots from perpendicular to the rails to a position folded upon the rails. When unfolded, the plate supports cargo place thereupon as a user grasps the handle to move the cart. When folded, the plate supports a tabletop as the handle is positioned down and the cart positioned flat. Between the rails, a curved panel joins the rails and provides rigidity to the cart. The curved panel has an oval opening towards the handle and a round opening towards the axle. A tube passes through the round opening from below the axle to beneath the panel and towards the oval opening. Centered at the top of the panel, an aperture passes through the panel and the tube. The aperture receives a beach umbrella when the invention is in use at a destination.

Additionally, the beach cart has a locking mechanism to retain the plate in either the folded or unfolded position, wide wheels for travel upon loose surfaces, and a folding tabletop.

Therefore, it is an object of the invention to provide a new and improved beach cart for carrying cargo.

A further object of this invention is to provide a type of cart that can also be used upon soft surfaces, such as in a field, a park, or on a grassy surface, and functions as the cart for conveying all of the accessories required, for example, a party in the park, a reunion, a sporting event tailgate party, and for related applications.

It is a further object of the present invention to carry an umbrella within the beach cart, allowing for compact stowage of a generally unwieldy umbrella.

It is a still further object of the present invention to provide a container that retains an umbrella when the beach cart is upright.

It is a still further object of the beach cart to support an umbrella when unfolded at a destination.

It is a still further object of the present invention to have a plate to carry cargo that also folds to support a tabletop.

It is a still further object of this invention to secure a plate in either a folded or an unfolded position.

The beach cart is designed to accommodate differing sizes of tires so as to facilitate usage of the cart for varying purposes.

Lastly, it is another object of this invention is to provide for wide wheels when the beach cart is used on loose surfaces such as sand or mud.

These and other objects may become more apparent to those skilled in the art upon review of the invention as described herein, and upon undertaking a study of the description of its preferred embodiment, when viewed in conjunction with the drawings.

BRIEF DESCRIPTION OF THE DRAWINGS

FIG. 8 is an isometric view of a variation upon a set of arms for a modified plate for supporting a tabletop;

FIG. 9 is a partial front view of the plate of FIG. 8;

FIG. 10 is a modified tabletop;

FIG. 11 is a side view of the modified tabletop shown in FIG. 10;

FIG. 12 is a front view of the modified panel between the wheels;

FIG. 13 is a top plan view thereof;

FIG. 14 is a side view of the modified rails;

The same reference numerals refer to the same parts throughout the various figures.

DESCRIPTION OF THE PREFERRED EMBODIMENT

Figure 1:
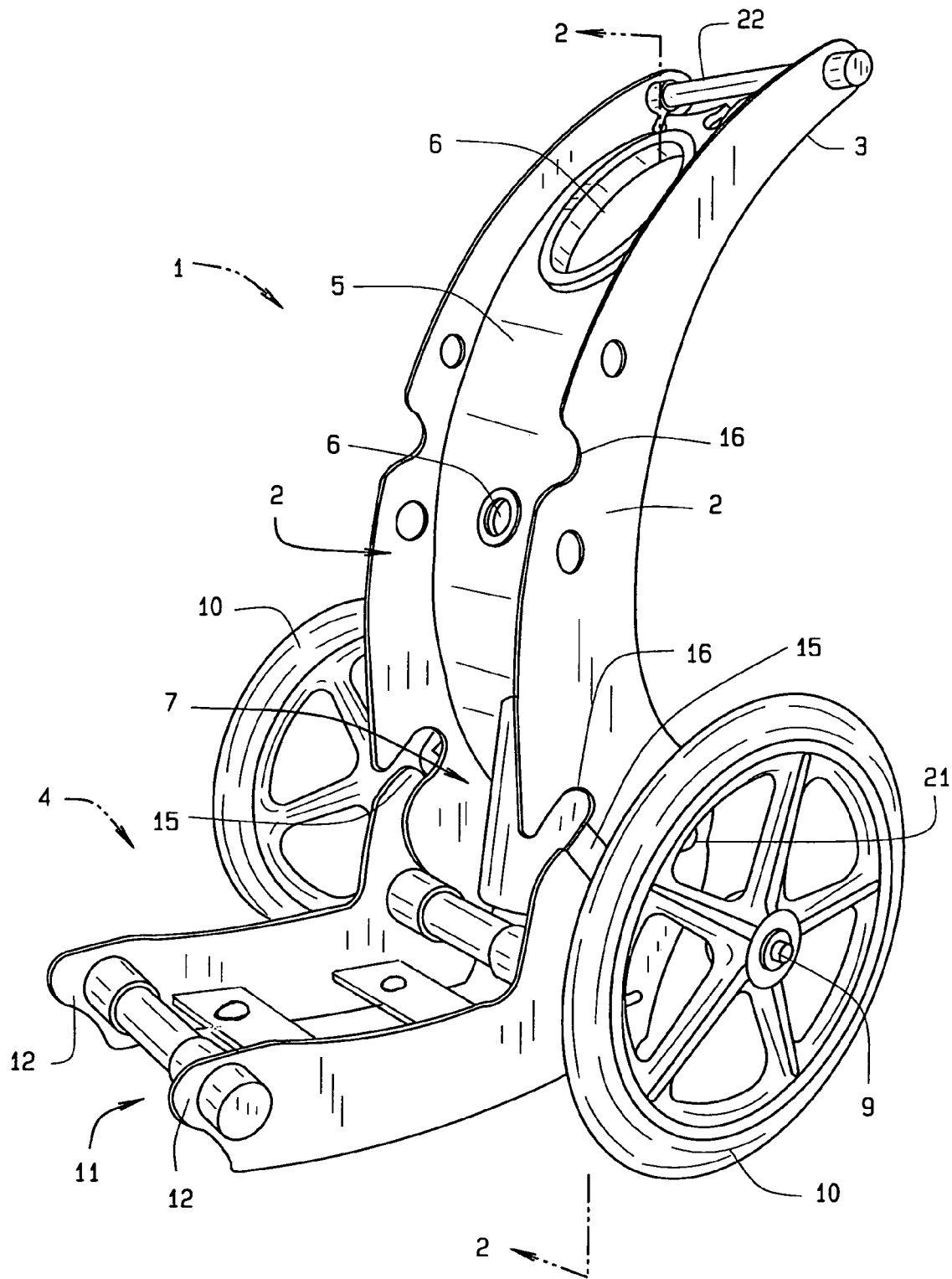
FIG. 1 is an isometric view of the preferred embodiment of the present invention upright and showing the plate unfolded to accept cargo.

The present art overcomes the prior art limitations by providing a beach cart that carries an umbrella and other bulky cargo to a destination such as a beach. In referring to the drawings, and in particular FIG. 1, the beach cart is disclosed. The beach cart 1 has two parallel and spaced apart rails 2. The rails have an arcuate shape to provide elevation for a tabletop later shown in FIG. 3. The rails have a forward end 3 and an opposite rear end 4. At the forward ends of the rails, a handle 22 spans across the rails and allows a user to grasp, to pull, and to steer the beach cart. The handle is perpendicular to both rails and has a generally round cross section. Opposite the handle, the beach cart has an axle 9 spanning through and beyond both rails. The axle is parallel to the handle and perpendicular to the rails. The axle passes through a minor tube 8 that separates the rails at the rear end. The rails each then have a plurality of notches 16, here shown as two. The notches are mutually spaced apart and receive components of a plate 11. Each rail has a first notch near the rear end, a second notch upwards from the first notch, and a third notch upwards from the second notch along the rail towards the front end.

Within the rails, a panel 5 follows the arcuate shape of the rails and spaces the rails apart. The panel has a first opening 6, generally oval or other shape, proximate to the handle and a second opening, generally round in shape, proximate to the axle and a third opening 6 for an umbrella pole centered in the panel 5. A major tube 7 extends through the second opening, joins the minor tube 8 and admits the axle 9, and extends short of the plate 11. The axis of the major tube 7 is aligned with the first opening so that an umbrella fits into the first opening and rests within the major tube, later shown in FIG. 5.

Connected to the rails near the axle, a plate moves from a folded position to an unfolded position shown in FIG. 1. The plate has two arms 12, each arm connecting to a rail. The arms are mutually parallel and spaced apart and have a generally L shape. Between the arms, a plurality of struts 14 spans the gap between the arms and extends through and beyond the arms. The preferred embodiment here shown has at least two struts with one strut located towards the axle and in the flange of the L shape and the other strut spaced apart and located in the web of the L shape. The other strut extends through the arms and joins with two mutually parallel and spaced apart props 13. The props are outside of the arms and positioned along the web of the L shape so that when the plate is folded, a tabletop 18 rests upon the props as later shown in FIG. 6.

As mentioned above, an axle passes through the minor tube between the rails and outside of the rails. A wheel joins to each end of the axle, here shown as a narrow width wheel suitable for pavement and more solid terrain. Between a wheel and the arm, FIG. 1 shows a locking bar 21. The locking bar extends through both rails and engages one of two slots 15 upon each arm 12. When engaged in a slot 15, the locking bar 21 secures the plate in either a folded or an unfolded position shown in FIG. 1.

Figure 2:
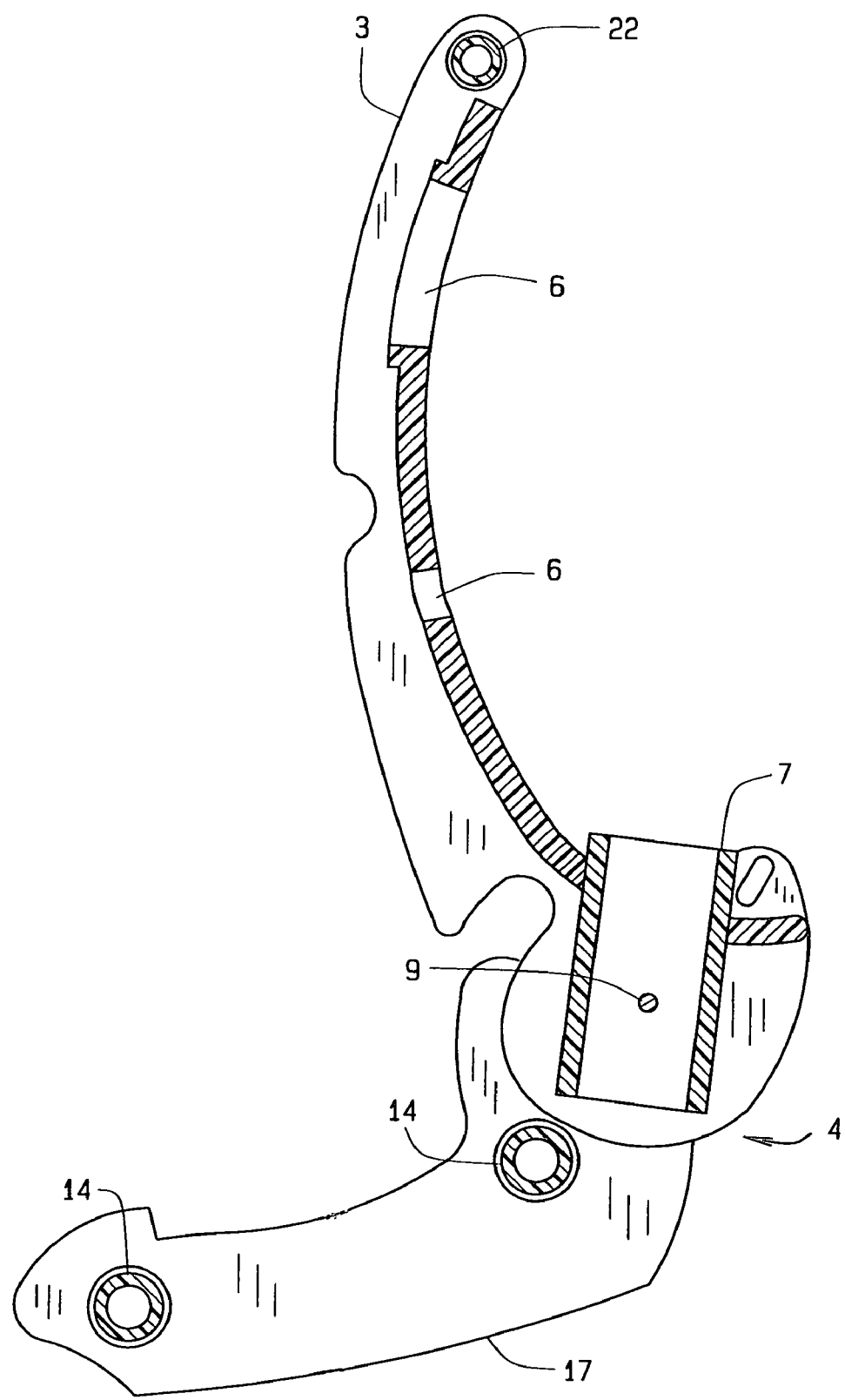
FIG. 2 is a longitudinal sectional view of the present invention.

As previously described, the beach cart has a major tube 7 for carrying an umbrella, pole, or other long cargo. In sectional view, the major tube is shown in FIG. 2. Taken on a plane through the longitudinal axis of the beach cart of FIG. 1, the sectional view begins with the handle here shown as round and at the forward end of the cart. The panel 5 extends away and upward from the handle 22 towards the first opening. The first opening has sufficient length and width or diameter to receive a folded umbrella. The first opening has reinforcement or a thickening upon the perimeter. The panel continues away from the first opening and upward to the peak of the panel. Near the peak, the panel has an aperture or opening 6 for a beach umbrella. When the beach cart reaches a destination, a beach umbrella or other pole is inserted through the aperture or opening 6 when the cart is flat and into the beach or ground. Beyond the peak towards the rear, the panel has a second opening that admits the major tube. The major tube 7 is a hollow cylindrical shape of sufficient diameter and length with an open top to contain the lower pole section and the umbrella section of a beach umbrella. The major tube is centered upon the panel and has a longitudinal axis parallel to the longitudinal axis of the beach cart. Away from the panel, the major tube 7 admits the axle 9 upon a diameter of the major tube. Opposite the panel, the major tube has a partially closed bottom with slots and the like to release sand or water from the umbrella out of the major tube. The sectional view then continues showing the struts 14 carried by the arms 12. One strut is located towards the major tube while the other strut 19 is located further away from the major tube and generally coplanar and mutually parallel. In the preferred embodiment, the struts are round in cross section though other shapes are possible.

Figure 3:
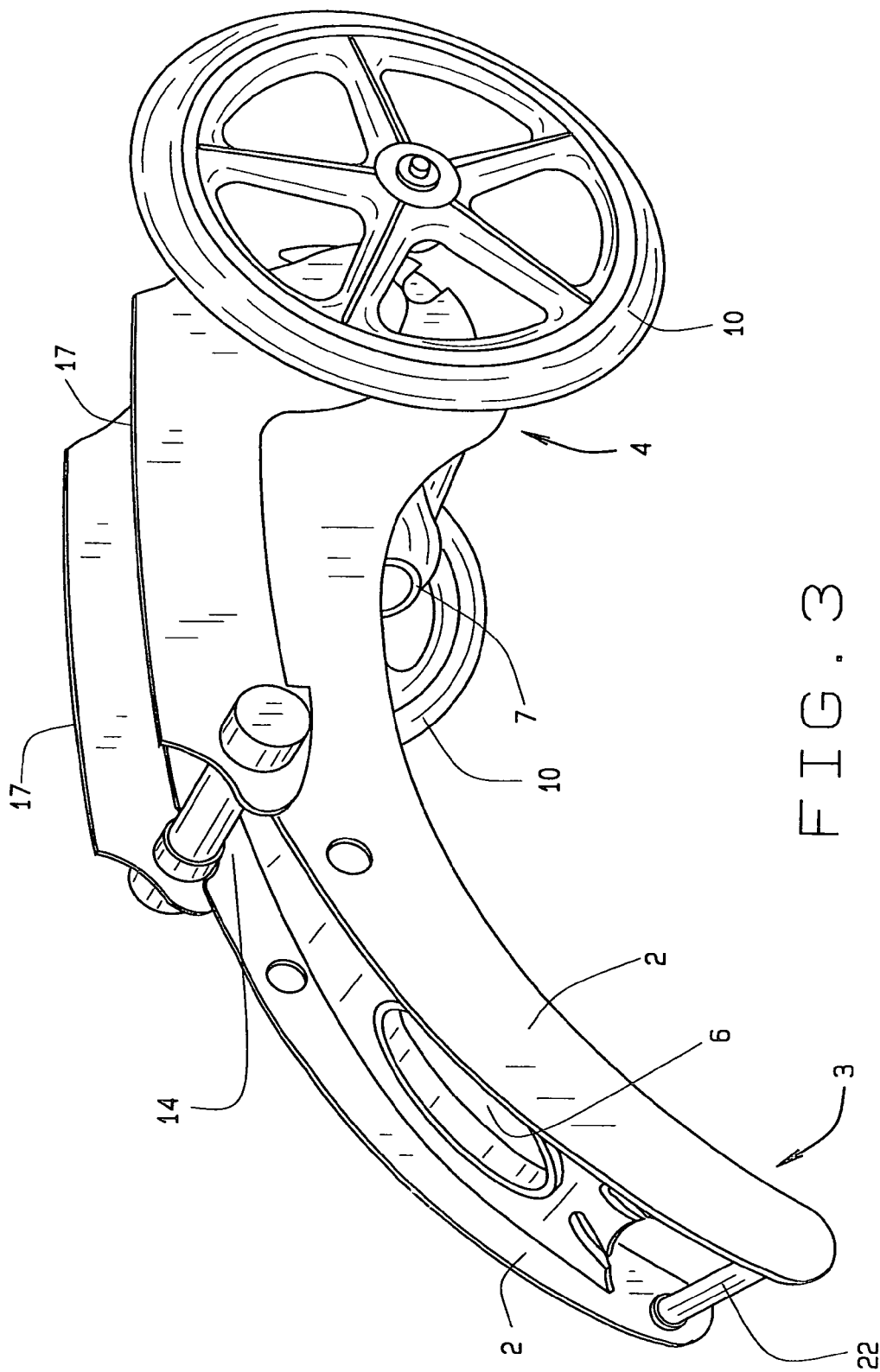
FIG. 3 is an isometric view of the present invention lying down with the plate folded.

Turning to FIG. 3, the beach cart lies flat at a destination such as a beach or for stowage in a vehicle. When flat, the handle 22 and the forward ends 3 of the rails 2 touch a surface. The rails then extend upwards from the handle to a comfortable elevation upon a surface for a tabletop later shown in FIG. 6. Here shown, the plate 11 is folded upon the rails 2 so the arms 12 can later support a tabletop 18. When folded, the plate has both the arms 12 located outside of the rails to provide a stable base for the tabletop 18. The struts 14 of the plate 11 rest within the notches of the rails. In this figure, a strut is shown resting in the third notch. Toward the rear end 4 of the rails and generally above the axle, each rail has a generally flat surface 17 that supports a tabletop in cooperation with the props and the arms.

Extended away from the rear end of the rails, a wheel flanks each side of the beach cart. The wheels are spaced outwards from the rails to provide stable movement of the beach cart. As before, the beach cart has a panel between the rails with a first opening towards the handle. The first opening aligns with a major tube here shown empty and towards the axle.

Figure 4:
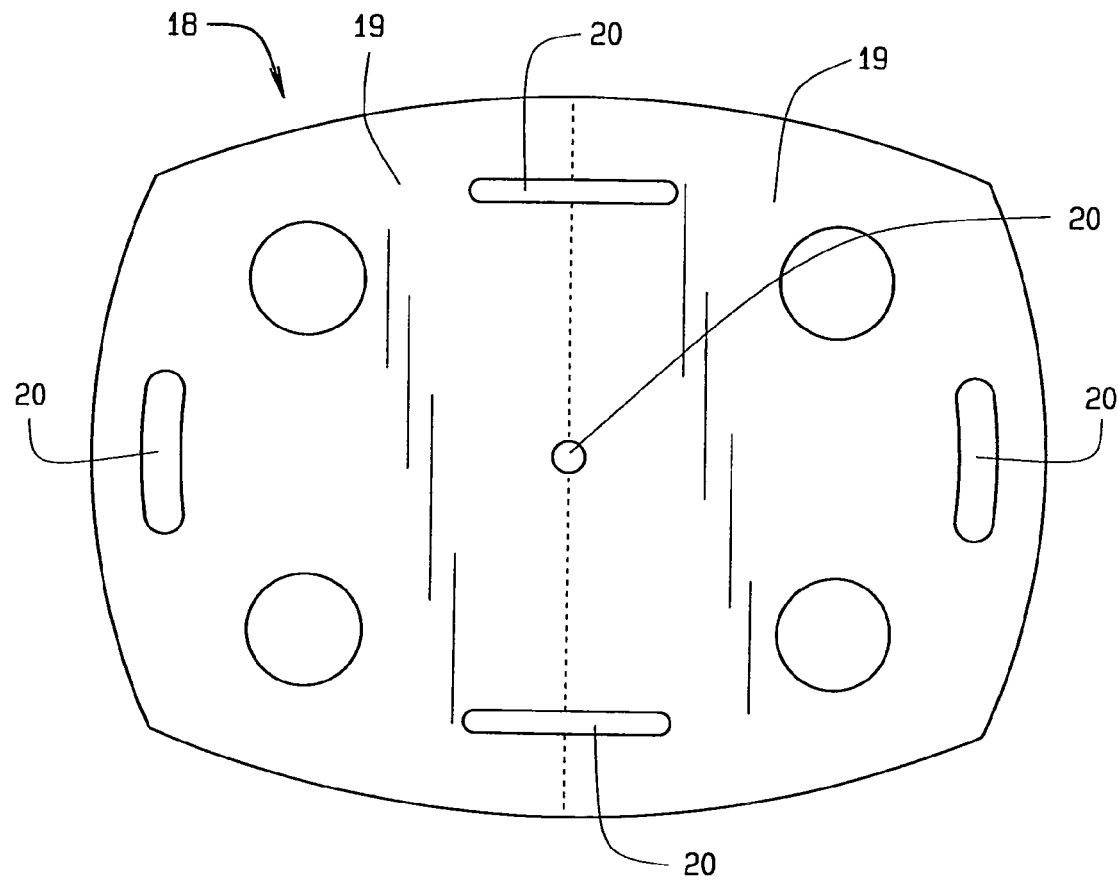
FIG. 4 is a top view of the tabletop component of the present invention.

To support cargo during transport and to serve as a flat surface when the cart reaches a destination, the beach cart 1 has a tabletop 18 shown in FIG. 4. The table top has a rounded rectangular shape with one or more hinges upon the lateral axis of the tabletop 18 dividing it into two halves 19. Upon the lateral axis, the tabletop also has two mutually parallel and spaced apart slots 20 and upon the longitudinal axis it also has two mutually parallel and spaced apart slots 20, though perpendicular to the preceding slots. The slots engage the props 13 and arms 12 when the tabletop 18 is deployed upon the beach cart. The slots also provide handholds when moving the tabletop or stowing cargo upon the tabletop when folded. Centered within the tabletop, an aperture or opening 20 locates a beach umbrella or other pole like object.

Figure 5:
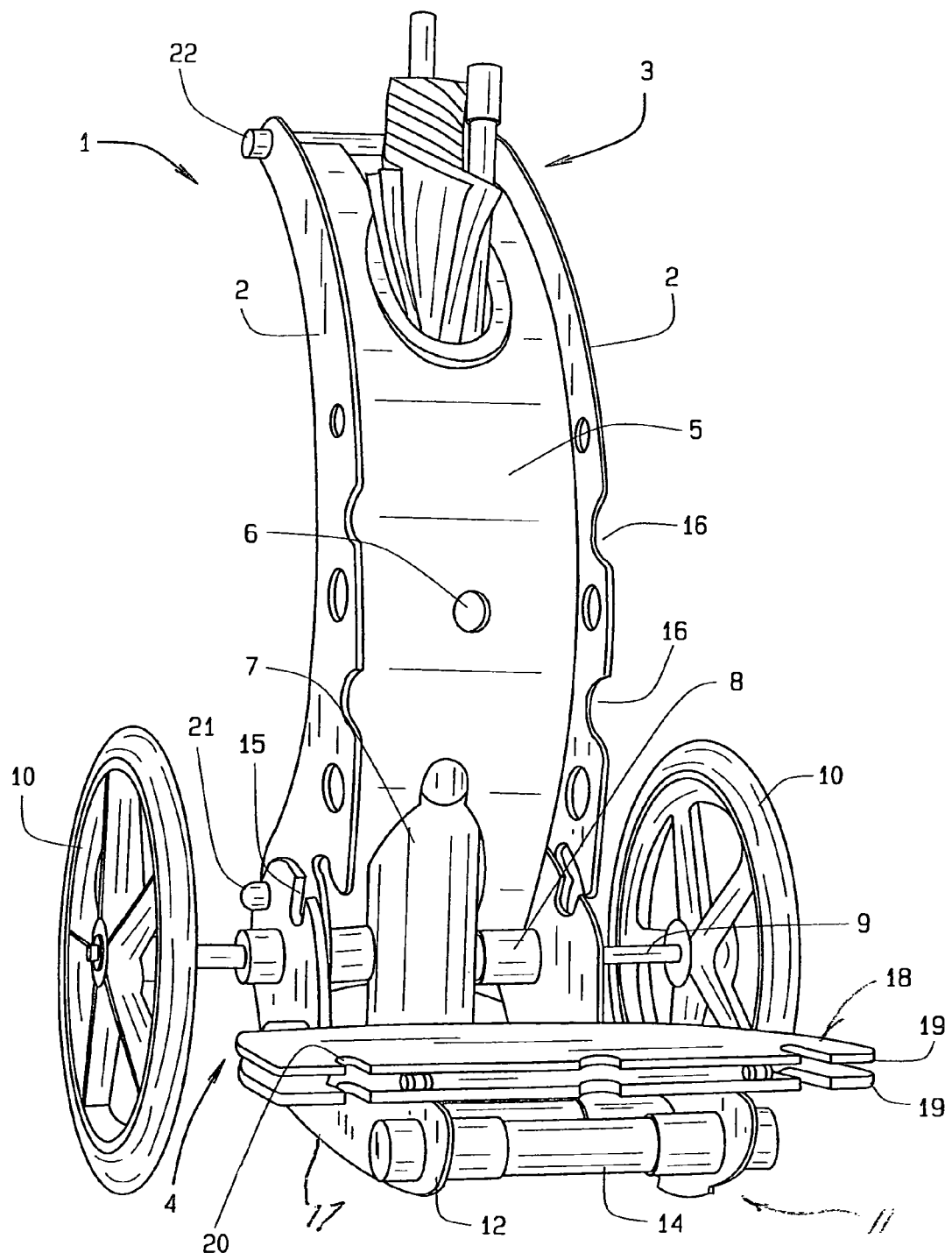
FIG. 5 is an isometric view of the present invention with the tabletop stowed and folded upon the plate of the present invention.

When folded, the tabletop fits upon the plate as shown in FIG. 5. FIG. 5 illustrates the preferred embodiment carrying cargo and an umbrella at a beach. The plate 11 is unfolded and contacts the surface upon which the wheels also travel, here beach sand. The arms 12 of the plate extend towards and around the minor tube 8 upon the axle 9. The arms 12 each have two slots 15 for engaging the locking bar 21, here shown the locking bar engages the first slots. The locking bar spans the rails and beyond both arms. The locking bar has a generally cylindrical shape and of sufficient diameter to resist crushing when the arms are loaded with cargo. Preferably, the locking bar has a diameter of at least one inch and slides into locking position.

Upon the plate, the tabletop 18 rests in a folded position. Other cargo can then be stacked upon the tabletop. An umbrella and a pole fit into the first opening 6 towards the handle 22 and extend downwards into the major tube 7, coming to rest upon the bottom of the major tube 7.

Outside of the rails 2 and major tube 7, the axle 9 extends through the minor tube 8 to a width greater than the plate and the props. The bare axle extends outside of the minor tube and connects with the hubs of the wheels 10.

Figure 6:
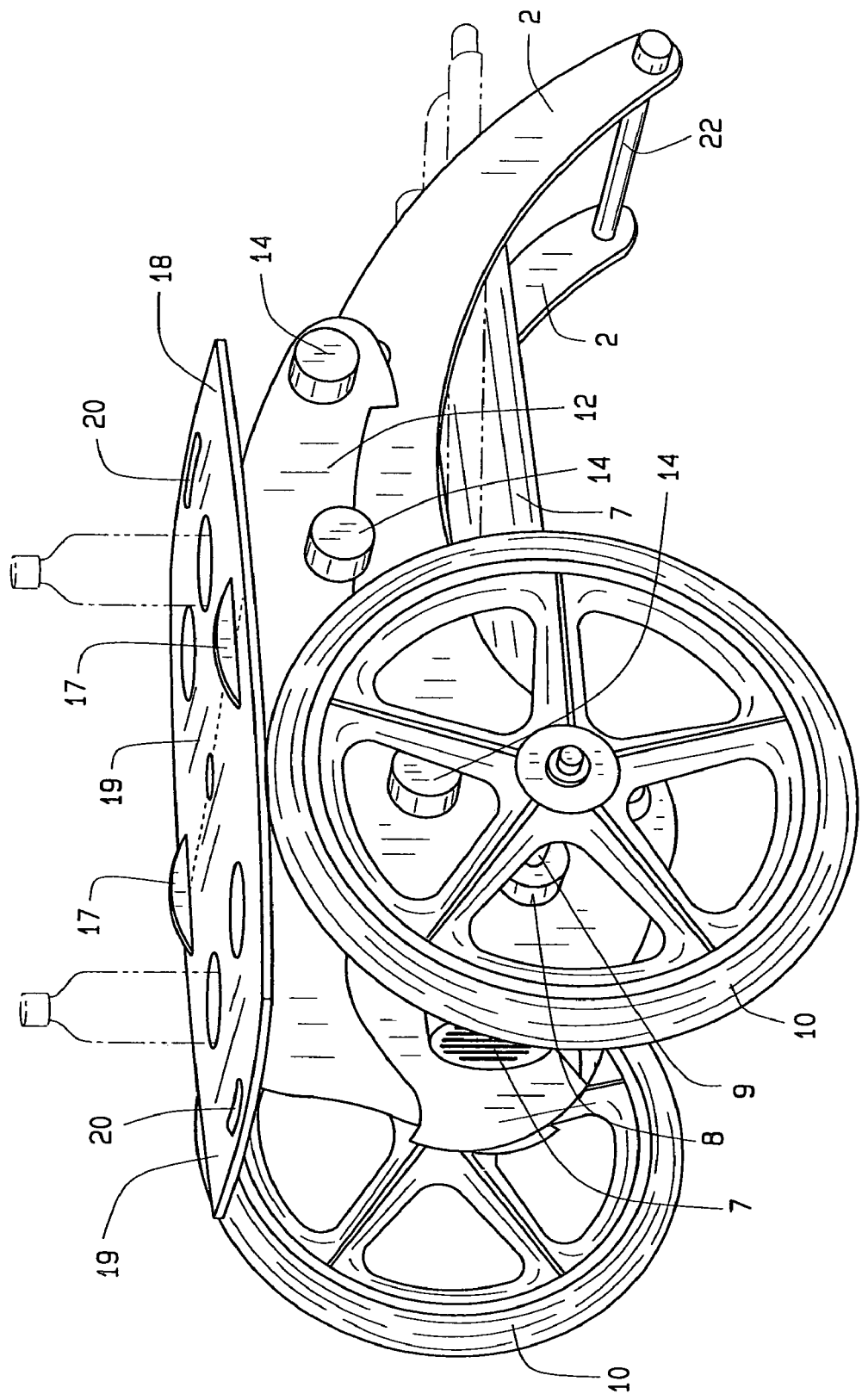
FIG. 6 is an isometric view of the present invention laying flat with the tabletop component unfolded.

Similar to FIG. 3, FIG. 6 shows the preferred embodiment with the plate 11 folded and the rails 2 and the wheels 10 in contact with the surface. The rails at the handle 22, upon the surface or beach, place the beach cart into a supporting position for the tabletop 18. To support a tabletop 18, the locking bar 21 is removed from the first slots 15, the arms 12 are rotated towards the rails 2, the struts 14 engage matching notches 16 upon the rails, and the locking bar 21 is reinserted in the second slots 15. The beach cart is then tipped forward thus orienting the lower edges of the props upward. The lower edges of the props extend through protrusions 17, and then engage the longitudinal slots of the tabletop. The protrusions 17, as can be noted in FIG. 6, may extend from the bottom edge of the arms 12, and extend through the slots provided within the tabletop 18, as can be noted. The tabletop is then secured against incidental movement. The tabletop has a central hole that aligns with the aperture in the panel between the rails. A pole for an umbrella can then be inserted through the tabletop 18 into the aperture and then come to rest upon the surface.

Figure 7:
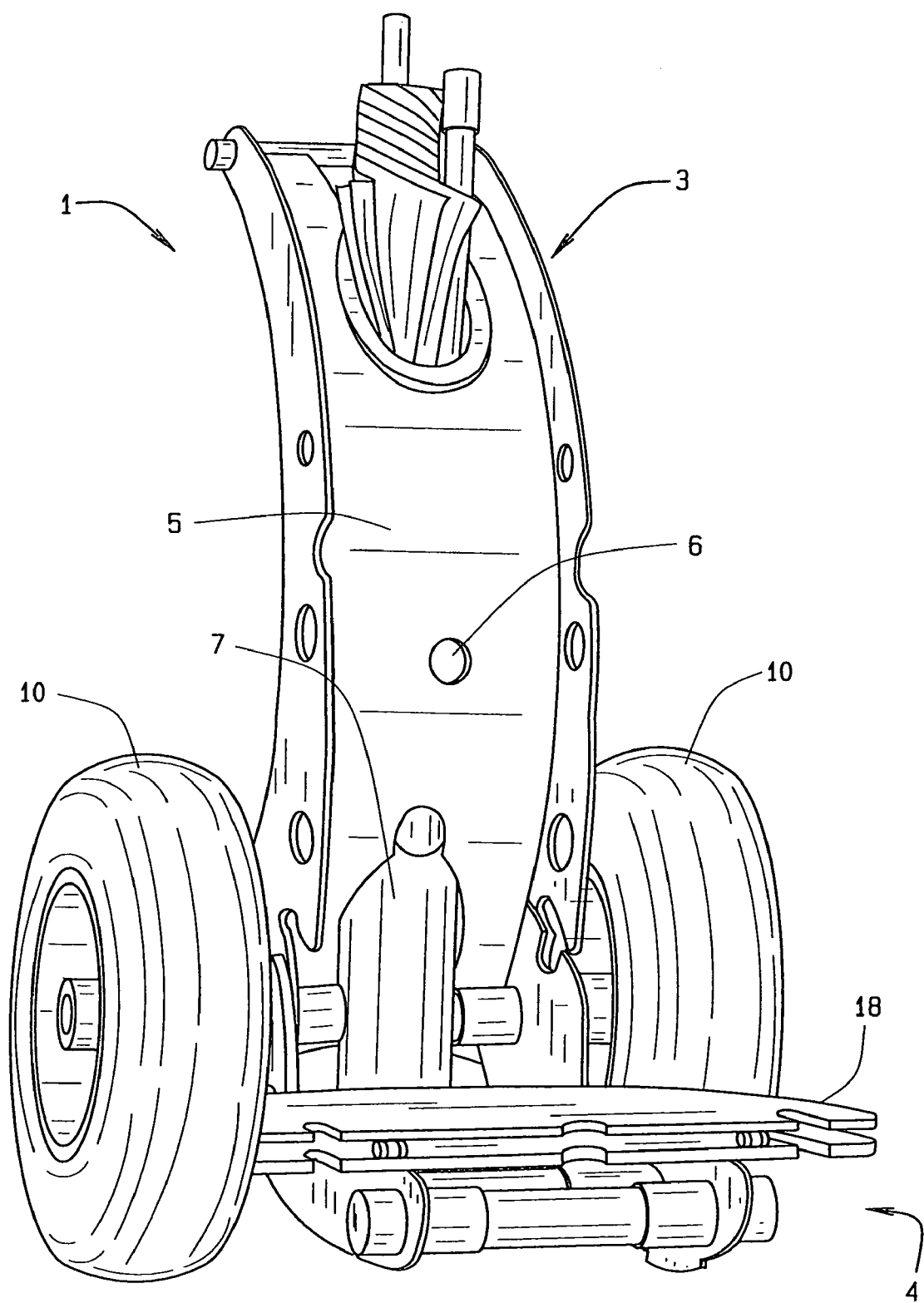
FIG. 7 is a front view of the present invention bearing the tabletop stowed but with alternate wider wheels.

The beach cart can operate on sandy, wet, or other low traction surfaces. The narrow wheels 10 of the preferred embodiment function well on wet or packed sand. However, an alternate embodiment is called for on dry loose sand or mud. FIG. 7 shows an alternate embodiment of the beach cart equipped with wheels having inflatable tires 10. The inflatable tires have a width approximately that of the diameter of the rim of the wheel. The tires are constructed of a material such as vulcanized rubber for flexibility and durability in a bumpy and an abrasive environment such as a beach.

As previously summarized, while this invention is defined as a beach cart, it can just as likely be used at other locations, such as for a picnic in the park, at a tailgate party such as before a sporting event, which has become so popular, or it can even be used for reunions, or even have backyard usage, as desired. The device is just not limited for usage on the beach. For that reason, there are different size wheels that may be applied to facilitate usage of this cart when employed.

FIG. 8 shows a modified form of plate 30 incorporating its two arms 31, and having cross-bracing 32 extending therebetween. The apertures 33 are provided for accommodating the extension of an axle, similar to the axle 9 (see FIG. 5) therethrough, when installed into the cart structure. The struts 34 are provided for the same purpose as the struts previously defined.

FIG. 9 shows a further modification of the bracing 32 extending between the arms 31. The apertures are provided for accommodating any tie down means, that may be useful for holding other items. The tabletop, in addition to the bracings 32, offer a base for holding items, while the bracings 32 can hold cups, cans, or the like, through their shown apertures.

The extensions 35 provided extending from the surface of the arms 31 are provided for extending through a tabletop, so as to position the same when installed upon the plate, as when set up in the position as shown in FIG. 6 when the cart is rested upon a surface, and a tabletop is located in place.

An example of a modified form of tabletop can be seen in FIGS. 10 and 11. The tabletop 36 may come in two parts, and be hinged at its center, as can be seen at 37. The two parts 38 and 39 are readily disclosed in FIG. 10.

FIG. 12 shows a side view of one of the rails 40 for the modified cart, and FIG. 12 shows the plate 41 that locates between a pair of rails, and is locked into position by means of its projections 42 that extend into and are secured within the slots 43 provided through the side rails 40.

A major hole 44 is provided for accommodating the insertion of an umbrella therethrough.

FIG. 13 shows a cross-brace 45, provided at the bottom between the rails 40, and into which the bottom of an umbrella may locate within its opening 46.

Figure 15:
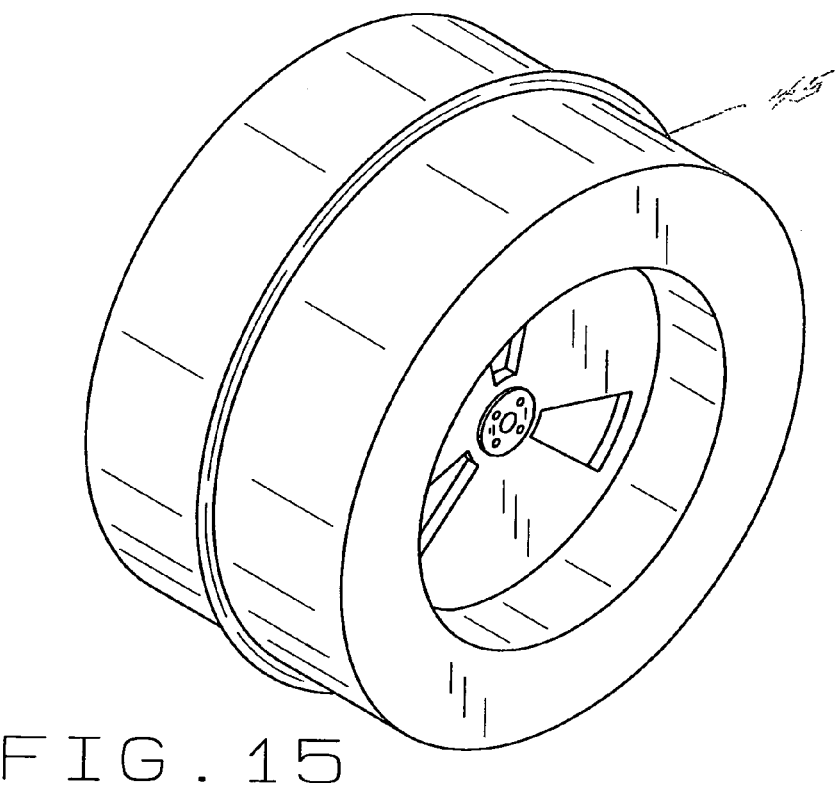
FIG. 15 shows a double wide tire for the cart.
Figure 16:
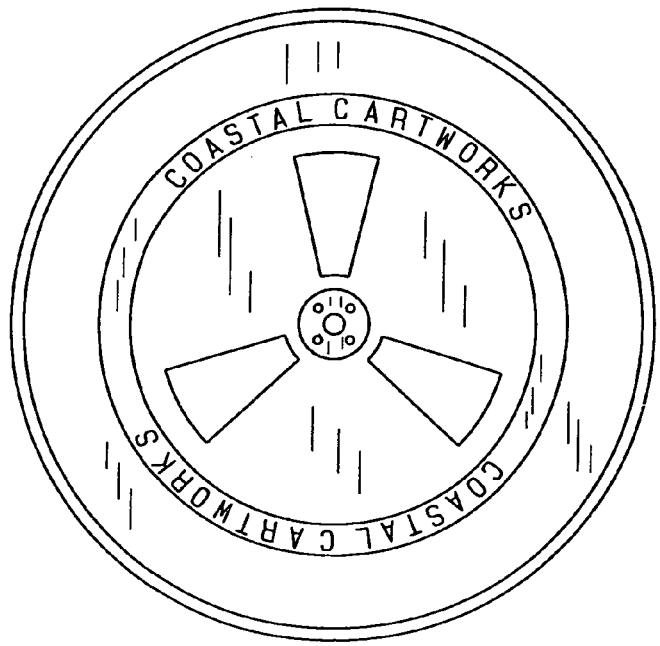
FIG. 16 is a side view thereof.
Figure 17:
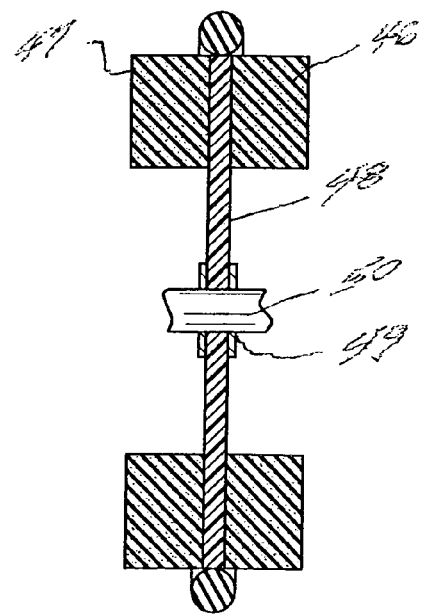
FIG. 17 is a sectional view through a wide tire of the type shown in FIG. 15.

FIGS. 15-17 show a widened type of tire 45 that may be formed of rubber or other polymer material in halves, as noted at 46 and 47, and with a rim 48 embedded within the same, and having a bearing opening 49 through which an axle 50 may locate. This is if a wider wheel is needed for rolling the cart over sand, or other soft surface, when the cart is used for beach purposes.

From the aforementioned description, a beach cart has been described. This beach cart is uniquely capable of transporting cargo and supporting an unfolded beach style umbrella. This beach cart and its various components may be manufactured from many materials including but not limited to polymers, low density polyethylene, high density polyethylene, polypropylene, nylon, ferrous and non-ferrous metals, their alloys, and composites. Or, the cart, or parts thereof, may be formed of wood.

Variations or modifications to the subject matter of this invention may occur to those skilled in the art upon reviewing the development as described herein. Such variations, if within the scope of this development, are intended to be encompassed within the principles of this invention, as explained herein. The description of the preferred embodiment, in addition to the depiction within the drawings, are set forth for illustrative purposes only.

I claim:

1. A cart for low traction terrain comprising:
    a pair of parallel mutually spaced apart rails having a forward end and an opposite rear end;
    a panel spanning between said rails having at least one opening;
    a major tube extending through an opening in said panel and orienting parallel to the longitudinal axis of said cart;
    a minor tube of lesser diameter than said major tube and perpendicular to said major tube, said minor tube spanning and then extending outwards of said rails;
    an axle having two opposite ends, a generally cylindrical shape and passing through said minor tube and extending outward of said minor tube;
    a pair of wheels, each attaching to one end of said axle;
    a plate hingedly connected to said rails,
    said plate having two arms mutually spaced apart, parallel, positioned outside said rails and hingedly connecting to said rails; two props mutually spaced apart outside said arms and parallel; at least two struts spanning between and through said arms and connecting to said props; at least one strut spanning between said arms located towards said axle; and,
    said arms having at least a first slot and a second slot proximate to said axle.

2. The cart of claim 1 further comprising:
    said rails each having at least two notches mutually aligned and spaced along each of said rail, said notches receive said struts when said plate is folded upon said rails.

3. The cart of claim 1 further comprising:
    said rails having an arcuate shape and said notches located upon the outside of said rails.

4. The cart of claim 1 wherein said props have an elongated rounded planar shape and at least one protrusion upon an edge of each of said props.

5. The cart of claim 4 further comprising:
a tabletop, having two halves hingedly connected and two or more slots, said tabletop having a folded position where said halves are located upon one another and an unfolded position where said halves are opened in the same plane;
said slots having a shape to fit over said protrusions when said tabletop is unfolded; and,
said halves having a size to fit within said wheels when said tabletop is in a folded position.

6. The cart of claim 1 further comprising:
a locking bar spanning between and through said rails, said locking bar engages said first slot and said second slot in said arm when said plate is unfolded and folded respectively.

7. The cart of claim 1 wherein said wheels have a narrow width.

8. The cart of claim 1 wherein said wheels have a wide width that provides traction on loose, damp, or wet terrain.

9. The cart of claim 1 further comprising:
a handle located proximate to said front end.

* * * * *